(12) United States Patent
Maino et al.

(10) Patent No.: US 7,189,175 B2
(45) Date of Patent: Mar. 13, 2007

(54) TENSIONER EQUIPPED WITH A NO-RETURN DEVICE AND METHOD OF DISABLING ANTI-ROTATION DEVICE

(75) Inventors: Bruno Maino, Monza (IT); Daniele Redaelli, Merate (IT); Stefano Banfi, Bussero (IT)

(73) Assignee: Morse TEC Europe, S.r.l., Milan (IT)

( * ) Notice: Subject to any disclaimer, the term of this patent is extended or adjusted under 35 U.S.C. 154(b) by 2 days.

(21) Appl. No.: 11/224,801

(22) Filed: Sep. 13, 2005

(65) Prior Publication Data

US 2006/0084538 A1 Apr. 20, 2006

(30) Foreign Application Priority Data

Oct. 15, 2004 (EP) ................... 04425778

(51) Int. Cl.
  *F16H 7/08* (2006.01)
(52) U.S. Cl. ................................ 474/110
(58) Field of Classification Search .......... 474/110; 92/30, 165 PR
See application file for complete search history.

(56) References Cited

U.S. PATENT DOCUMENTS 3,812,733 A 5/1974 Yoshida

2004/0147349 A1\* 7/2004 Markley et al. ............ 474/110

FOREIGN PATENT DOCUMENTS

EP 1188955 3/2002
JP 06002745 1/1994

\* cited by examiner

*Primary Examiner*—F. Daniel Lopez
(74) *Attorney, Agent, or Firm*—Brown & Michaels, PC; Greg Dziegielewski

(57) ABSTRACT

A hydraulic tensioner is provided with a no-return device and with an anti-rotation device capable of being disabled having a pin, integral with the cylinder of the tensioner, which slides in a first longitudinal slot formed on the outer wall of the piston and a means able to disable the anti-rotation device. The disabling means includes a second slot, at right angles with respect to the first longitudinal slot to which it is connected, situated at the end of the first longitudinal slot nearer to the bottom of the cylinder. The second slot may also be a throat connected to the first longitudinal slot to which it is perpendicular, and which extends for the whole circumference of the piston. The second slot is preferably shaped as a ramp to join the bottom of the first longitudinal slot to the outer surface of the piston.

12 Claims, 5 Drawing Sheets

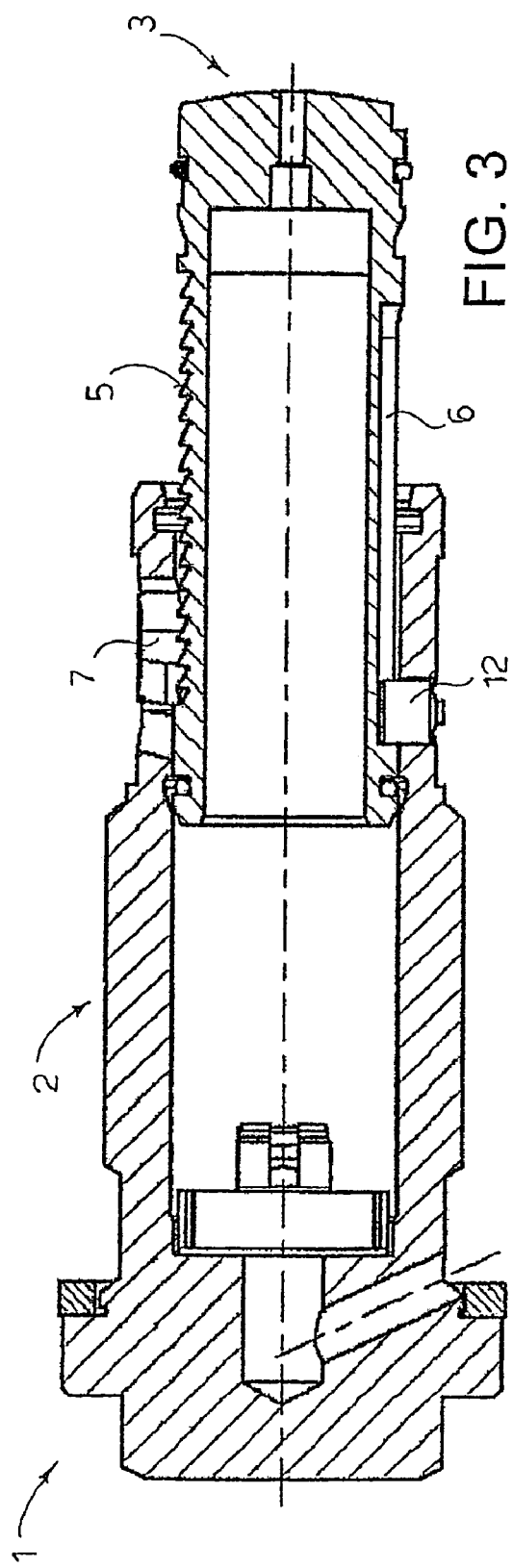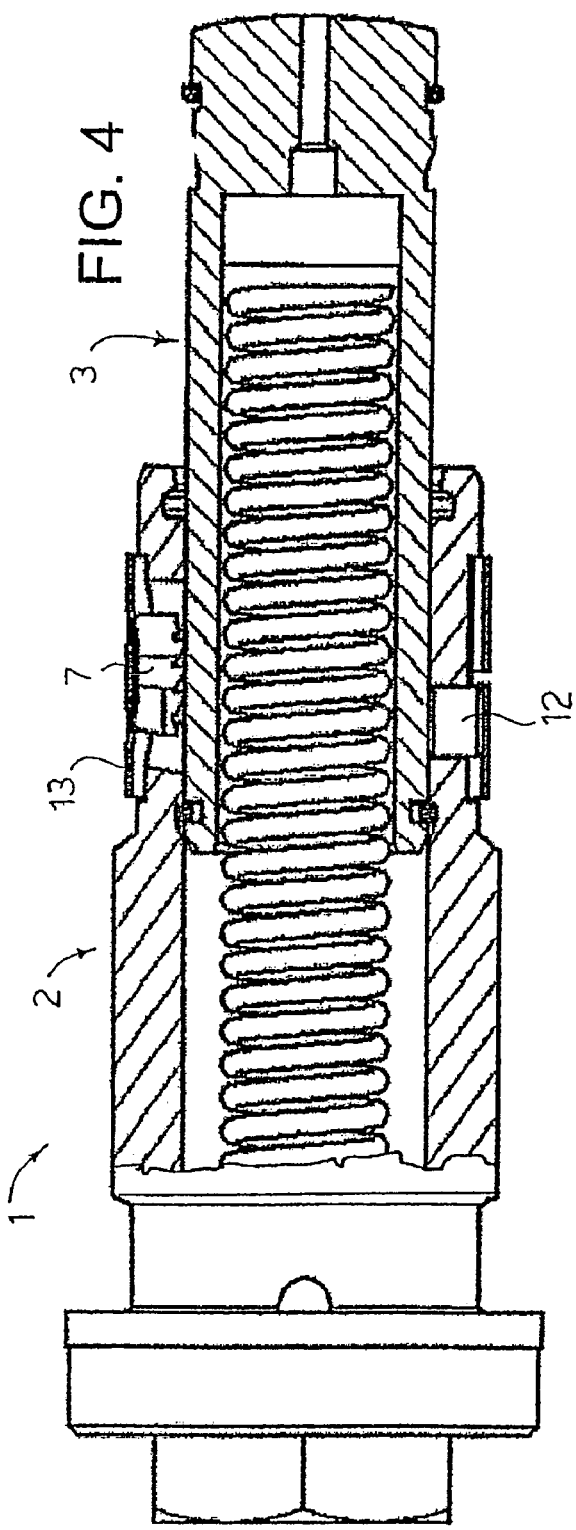

TENSIONER EQUIPPED WITH A NO-RETURN DEVICE AND METHOD OF DISABLING ANTI-ROTATION DEVICE

REFERENCE TO RELATED APPLICATIONS

This application claims priority from European Patent Application No. 04425778.0, filed Oct. 15, 2004, entitled, "HYDRAULIC TENSIONER, EQUIPPED WITH A NO-RETURN DEVICE, COMPRISING ANTI-ROTATION MEANS CAPABLE OF BEING DISABLED AND METHOD OF DISABLING SAID ANTI-ROTATION MEANS" under the benefit of 35 USC § 119 (a)–(d) or § 365(b). The aforementioned application is incorporated herein by reference.

BACKGROUND OF THE INVENTION

1. Field of the Invention

The invention pertains to the field of tensioners. More particularly, the invention pertains to a tensioner equipped with anti-rotation device capable of being disabled.

2. Description of Related Art

A timing system for an internal combustion engine can be controlled by a chain transmission, in which the chain is wound on two or more sprockets, one of which is a drive sprocket and takes its drive (even indirectly) from the drive shaft to transmit it to one or more driven shafts.

For reasons of adjustment, wear on materials and/or of taking-up of play, it is often necessary to compensate for a certain amount of slack of the chain. It is known to the art to use shoe tensioning devices, in which a shoe is biased with an adjustable force against a branch of the chain.

Various means for biasing the tensioning shoe against the chain are known. The most frequently used means are hydraulic tensioners, where a fixed member (generally a cylinder) is mounted on the engine block and a movable member (generally a piston, mobile inside the cylinder) is slidable with respect to the fixed member and acts against the shoe placed in contact with the chain to tension it. In these tensioning devices, the piston is pushed out of the cylinder towards the shoe disposed against a branch of the chain, by the combined action of a spring and pressurized fluid (generally oil) fed into the cylinder chamber through a check valve. Any slackening of the chain due to the heating, wear, and/or to time is compensated by the piston extending out of the cylinder under the action of the biasing means.

When pressurized fluid to be fed into the cylinder chamber is not available (for example because the engine is stopped or because it has only just been started), the piston is urged by the tension of the chain and can return partially into the cylinder, allowing the chain to slacken. This does not transmit the motion correctly from the drive sprocket to the driven sprockets, compromising the efficiency and the reliability of the timing system and being able to put the engine "out of phase," an arrangement known to the art, for example from European Patent No. 1,188,955 in the name of the Applicant and herein incorporated by reference. European Patent No. 1,188,955 discloses overcoming the drawback, by coupling the cylinder to a pawl which, interacting with a rack coupled to the piston, prevents the piston from returning into the cylinder when pressurized fluid is not available.

To increase the reliability of a "rack and pawl" no-return device and to prevent the piston from being able to rotate accidentally with respect to the cylinder, thus disengaging the rack from the pawl, anti-rotation means or devices are usually provided such as, for example, a closed longitudinal slot, formed on the outside wall of the piston along a generatrix of the piston. A pin, integral with the cylinder and slidable in the longitudinal slot of the cylinder, engages with closed longitudinal slot.

The anti-rotation means or device further prevents the piston from accidentally slipping out of the cylinder. But, when a tensioner is removed from an engine, the anti-rotation means do not allow, without involving actions which are normally long and expensive, the piston to be returned into the cylinder. For example, facilitating the transport and the storage of the tensioner and/or re-using the tensioner for another engine involves actions which are normally long and expensive.

An object of the present invention is to overcome the above drawbacks by providing a hydraulic tensioner whose piston can be made to return easily into the cylinder by an operator by rotating the piston around its longitudinal axis to disengage the rack from the pawl.

SUMMARY OF THE INVENTION

A hydraulic tensioner is provided with no-return device and an anti-rotation device which may be disabled to disengage the piston of the hydraulic tensioner from the no-return device. A method of disabling the anti-rotation device is also disclosed.

The hydraulic tensioner is provided with a no-return device and with an anti-rotation device or means capable of being disabled. The anti-rotation device includes a pin, integral with the cylinder of the tensioner, which slides in a longitudinal slot formed on the outer wall of the piston and a means able to disable the anti-rotation device. The disabling means or device includes a second slot, at right angles with respect to the first longitudinal slot to which it is connected, situated at the end of the second longitudinal slot nearer to the bottom of the cylinder, or a throat connected to the first longitudinal slot to which it is perpendicular, which extends for the whole circumference of the piston. The second slot is preferably shaped as a ramp to join the bottom of the longitudinal slot to the outer surface of the piston.

BRIEF DESCRIPTION OF THE DRAWINGS

FIG. 3 shows a diagrammatic sectional view of the hydraulic tensioner of FIG. 2 with the piston completely extracted from the cylinder.

FIG. 4 shows a diagrammatic sectional view of the hydraulic tensioner of FIG. 2, with the piston completely extracted from the cylinder and rotated to disengage the rack from the pawl.

DETAILED DESCRIPTION OF THE INVENTION

Figure 1:
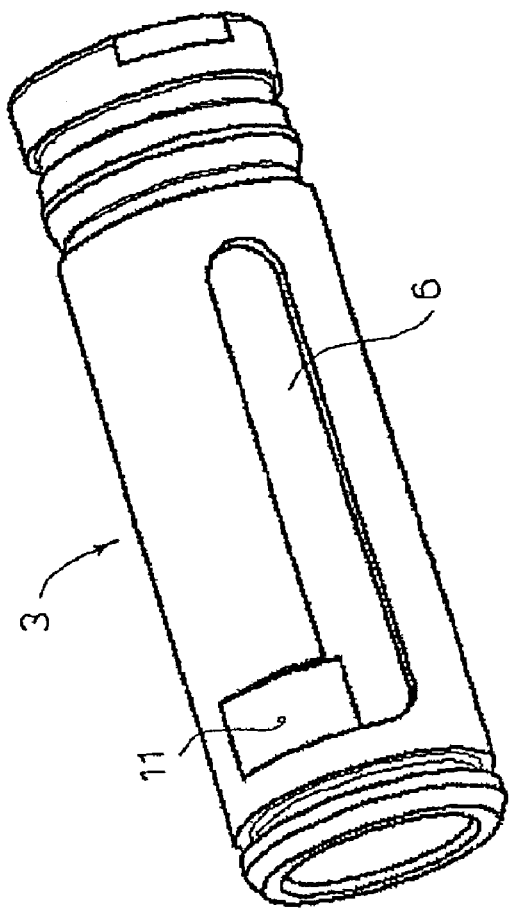
FIG. 1 shows a perspective view of a first embodiment of a piston for a hydraulic tensioner made according to the invention.

In the appended figures, corresponding elements are identified by the same reference numerals.

Figure 2:
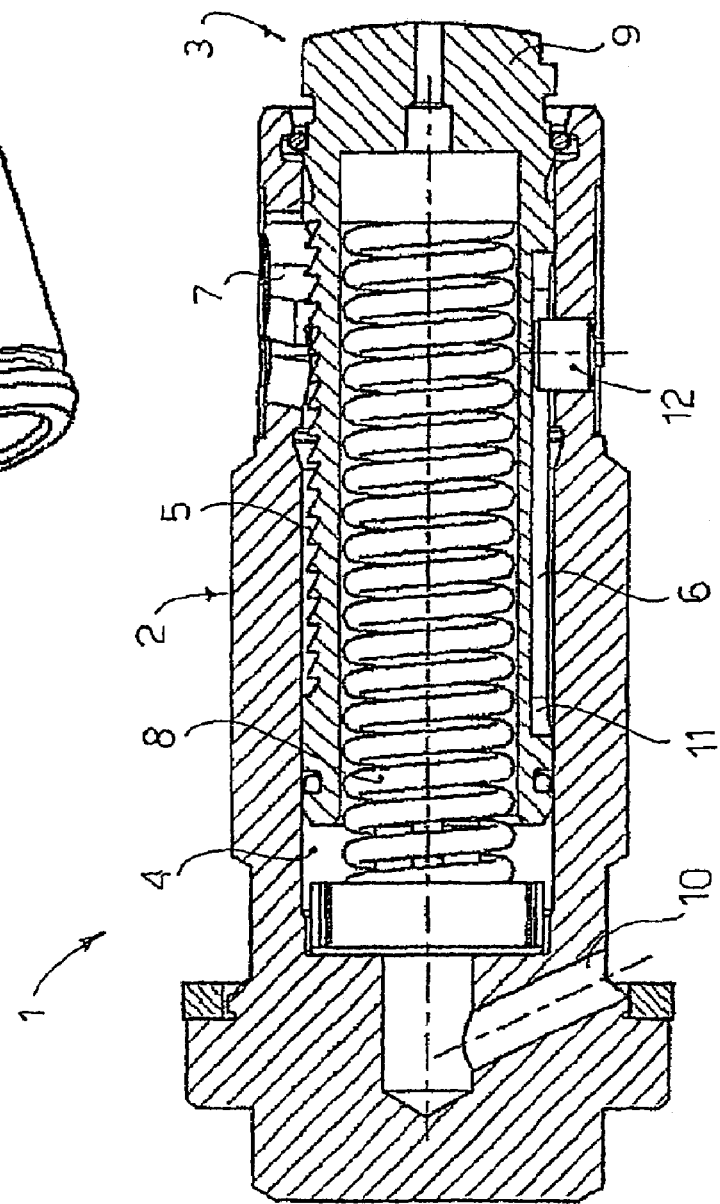
FIG. 2 shows a diagrammatic sectional view of a hydraulic tensioner of the prior art provided with the piston of FIG. 1.

FIG. 1 is a perspective view of a first embodiment of a piston 3 for a hydraulic tensioner, where the slot in which the pin 12 (FIG. 2) slides is L-shaped and includes a first longitudinal slot 6 and a second or further slot 11 (connected to the longitudinal slot 6 at a right angle, and preferably shaped as a ramp to join the bottom of the longitudinal slot 6 to the outer surface of the piston 3) situated at the end of the longitudinal slot 6 nearer the bottom of the cylinder 2, see FIG. 2.

FIG. 2 is a diagrammatic sectional view of a hydraulic tensioner 1 (of a type known in the art, for example, from European Patent No. 1,188,955), equipped with a piston 3 according to the invention.

The hydraulic tensioner 1 includes a cylinder or a housing 2 and a piston 3 housed slidably in a bore of the cylinder, the piston forming a cylindrical chamber 4 with the cylinder 2. The piston 3 bears the rack 5 which interacts with the pawl carried by the cylinder 2. The pawl 5 and the rack 7 form the no return means, allowing movement of the piston in a protruding direction and preventing movement in a retracting direction. The piston 3 is hollow on the inside and houses a pushing spring 8 acting between the head end 9 of the piston 3 and the bottom of the cylindrical chamber 4, which is in communication with a circuit for supplying pressurized fluid, generally oil, through an aperture 10 and a no-return valve, (not shown, but as known in the prior art).

The combined action of the spring 8 and the pressurized fluid in the chamber 4 biases the piston 3 out of the cylinder 2, so that the piston 3 comes to bear with its head end 9 against a shoe (omitted in the figure for the sake of simplicity and thus keep the chain taut. Also shown in FIG. 2 is a pin 12 engaged in the longitudinal slot 6 and the further slot 11.

For the sake of simplicity of the graphic representation, in the following figures only the cylinder 2, the piston 3, the rack 5, the longitudinal slot 6, the pawl 7 and the pin 12 are indicated by reference numerals.

FIG. 3 is a diagrammatic sectional view of the hydraulic tensioner 1, with the piston 3 completely extracted from the cylinder 2. The condition is easily obtained when the tensioner 1 is not connected to the engine and the piston 3 spontaneously protrudes from the cylinder 2 under the effect, for example, of the spring 8 (FIG. 2) and/or of its own weight.

In FIG. 3 the pawl 7 is engaged with the final portion of the rack 5 and the pin 12, engaged with one end of the longitudinal slot 6, prevents the piston 3 from slipping out of the cylinder 2.

FIG. 4 is a diagrammatic sectional view of the hydraulic tensioner 1 of FIG. 3, in which the anti-rotation means 6, 12 have been disabled by rotating the piston 3 around its longitudinal axis to insert the pin 12 in the further slot 11 to disengage the rack 5 from the pawl 7. The slot 11 is preferably shaped as a ramp (FIG. 1).

Figure 6:
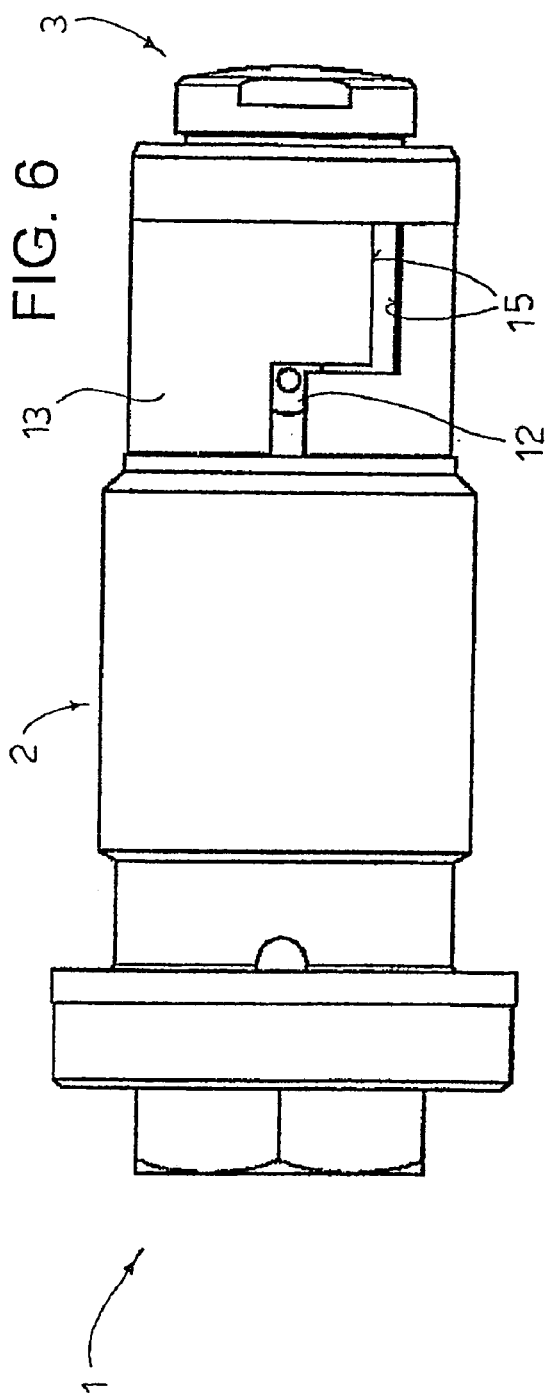
FIG. 6 shows a side view of the hydraulic tensioner of FIG. 5.

In FIG. 4 the pin 12 is held in place by a flexible foil 13 also shown in FIG. 6) applied to the outer surface of the cylinder 2. The pin 12, having come out of the longitudinal slot 6, has moved into contact with the outer surface of the piston 3.

Figure 5:
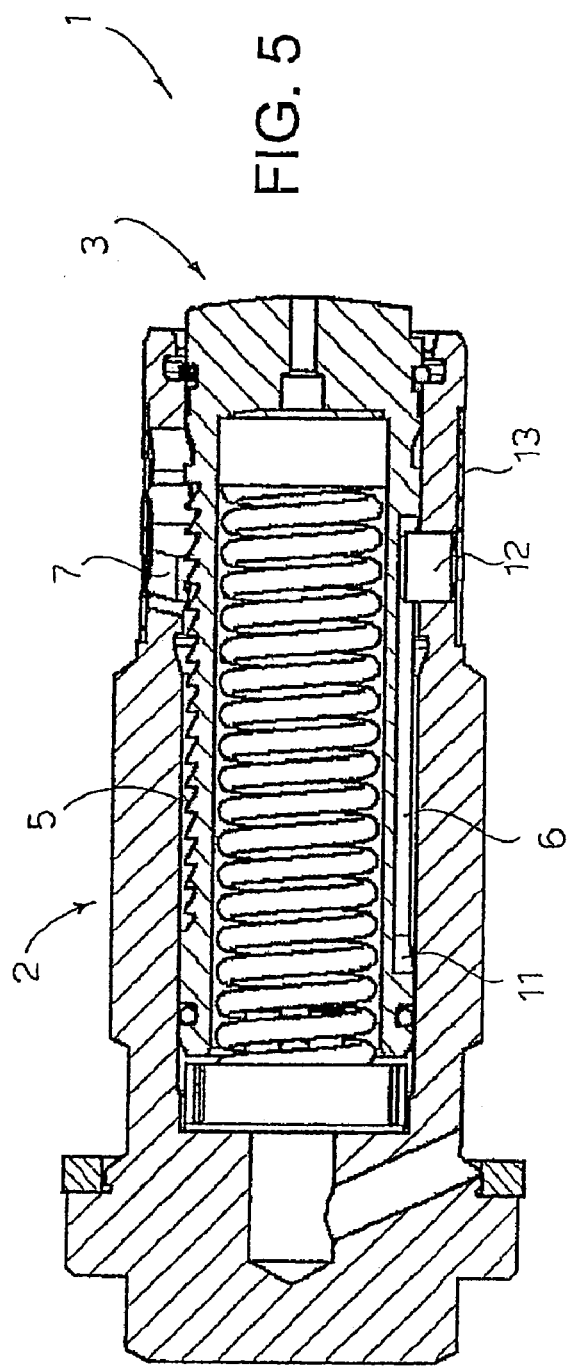
FIG. 5 shows a diagrammatic sectional view of the hydraulic tensioner of FIG. 2 with the piston completely returned into the cylinder.

FIG. 5 is a diagrammatic sectional view of the hydraulic tensioner 1 with the piston 3 completely retracted inside the cylinder 2 and locked therein by rotating the piston 3 to engage the pawl 7 with the rack 5. The pin 12 is engaged with the other end of the longitudinal slot 6 and the further slot 11 is visible. This configuration is advantageous for the transport and the storage of the hydraulic tensioner 1.

FIG. 6 shows a side view of the hydraulic tensioner 1 of FIG. 5. FIG. 6 shows the cylinder 2, the piston 3 completely inserted in the cylinder 2 and the flexible foil 13, which holds the pin 12 in place.

In a preferred embodiment shown in FIG. 6, the flexible foil 13 has two opposite flaps 15, which are L-shaped and are at least partially overlapping. In FIG. 6, the flaps 15 are slightly parted and allow the pin 12 beneath to be seen.

A method for disabling the above mentioned anti-rotation means 6, 12 includes the steps of extracting the piston 3 from the cylinder 2 to bring the pin 12 to one end of the longitudinal slot 6 level with the further slot 11 (FIG. 3) and rotating, for example in a clockwise direction, the piston 3 with respect to the cylinder 2 to bring the pin 12 into the further slot 11, thus disengaging the pawl 7 from the rack 5 (FIG. 4).

At this point the piston 3 can be made to return inside the cylinder 2 and fixed there by rotating the piston 3 in the opposite direction, for example counter-clockwise (FIGS. 5 and 6).

Figure 7:
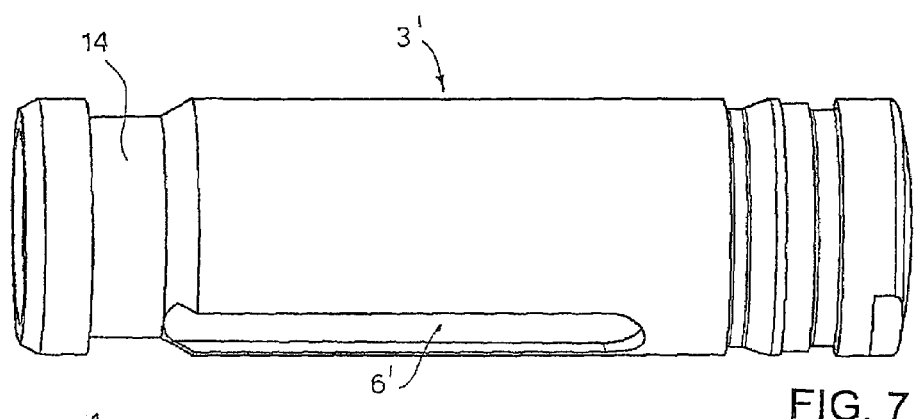
FIG. 7 is a perspective view of a second embodiment of a piston for a hydraulic tensioner.

FIG. 7 shows a perspective view of a second embodiment of a piston 3' for a hydraulic tensioner made according to the invention, which differs from that illustrated in FIG. 1 essentially in that the slot 6 is not L-shaped but ends in a throat 14, perpendicular to the longitudinal slot 6, which extends for the entire circumference of the piston 3'.

Figure 8:
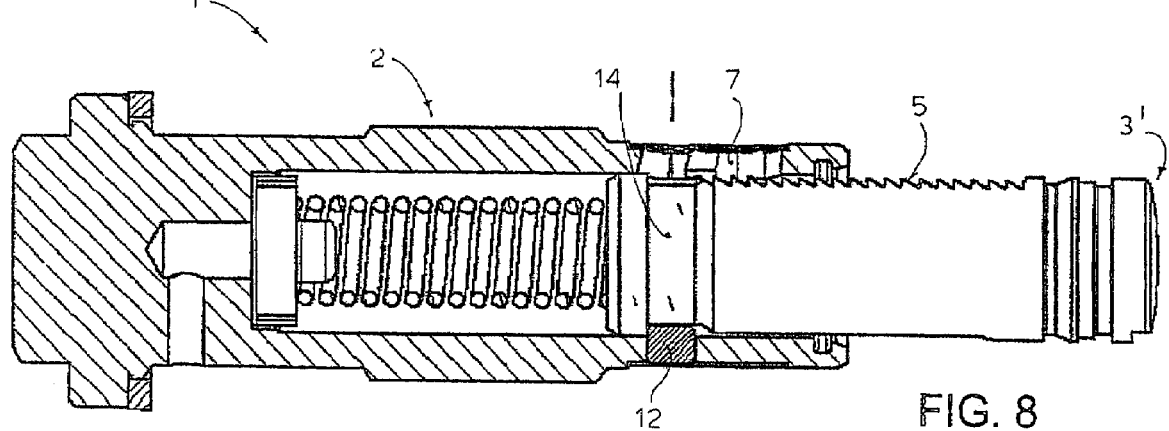
FIG. 8 shows a diagrammatic sectional view of a hydraulic tensioner of the prior art, equipped with the piston of FIG. 7 completely extracted from the cylinder.
Figure 9:
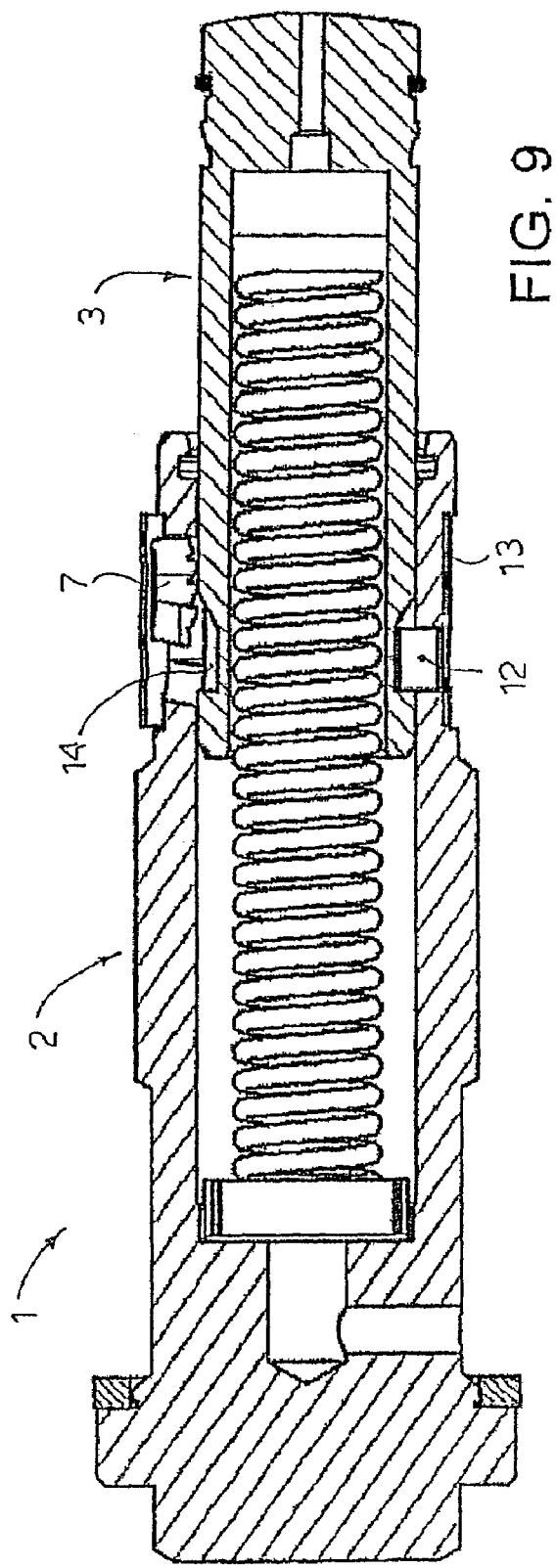
FIG. 9 shows a diagrammatic sectional view of the hydraulic tensioner of FIG. 8 with the piston completely extracted from the cylinder and rotated to disengage the rack from the pawl.

A method for disabling the anti-rotation means 6, 12 does not differ from that described previously with reference to FIGS. 1–4 and is shown summarily in FIG. 8, which is a diagrammatical sectional view of the hydraulic tensioner 1 with the piston 3' completely extracted from the cylinder 2, the pin 12 in the throat 14 and the rack 5 engaged with the pawl 7 and by FIG. 9, which shows diagrammatically, in cross section, the hydraulic tensioner 1 with the piston 3' completely extracted from the cylinder 2, the pin 12 in the throat 14 and the piston 3' rotated to disengage the rack 5 from the pawl 7.

Figure 10:
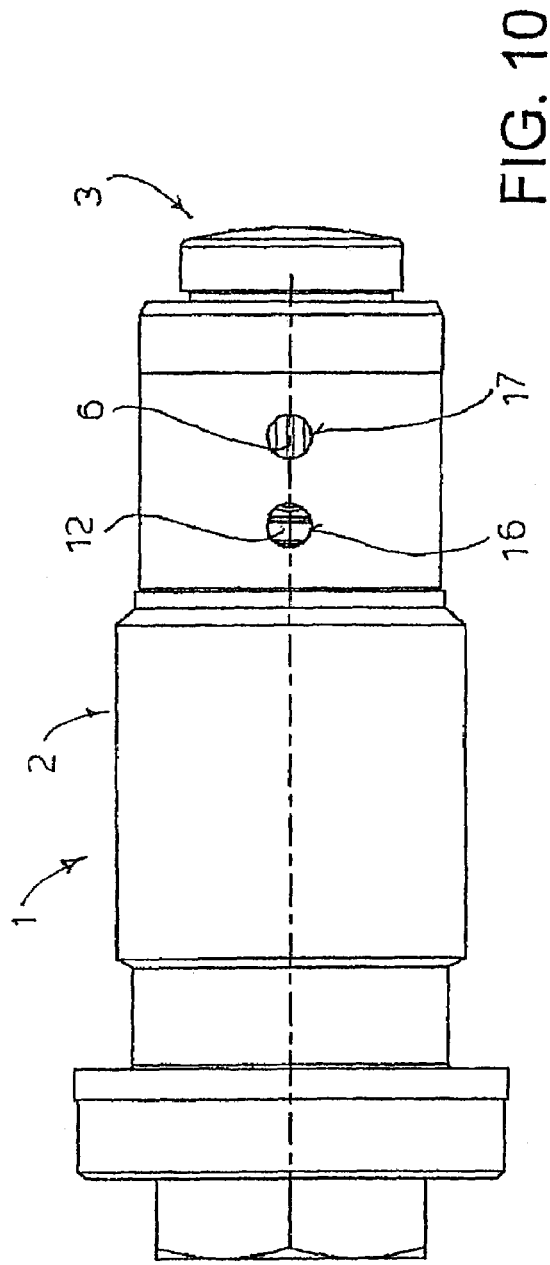
FIG. 10 shows a side view of the hydraulic tensioner of FIG. 8 with the piston completely returned into the cylinder.

FIG. 10 shows a side view of the hydraulic tensioner 1 with the piston 3' completely retracted into the cylinder 2. In FIG. 10, the hole 16 (occupied by the pin 12) and the hole 17, which shows an area of the longitudinal slot 6 beneath, are formed in the sleeve of the cylinder 2.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An improved hydraulic tensioner (1) including of a cylinder (2) having a bore and a pawl hole; a hollow piston (3) slidably received by the bore and defining a fluid chamber (4) with the bore having an inner end and an outer end; a spring (8) biasing the piston (3) in a protruding direction from the bore, the improvement comprising:

a no-return device (5, 7) comprising a pawl (7) received by the pawl hole and rack teeth (5) along a length of the hollow piston (3), allowing movement of the piston (3) in a protruding direction and preventing movement in a retracting direction; and an anti-rotation device (6, 11, 12) comprising a first longitudinal slot (6) connected to a second slot (11) at an angle for receiving a pin (12);

wherein when the piston (3) is fully protruding from the cylinder (2), the anti-rotation device is disabled and the piston (3) is disengaged from the no-return device.

2. The tensioner of claim 1, wherein the first longitudinal slot (6) is connected to the second slot (11) by a right angle.

3. The tensioner of claim 1, wherein the second slot (11) is formed at an end of the first longitudinal slot (6) near the inner end of the piston (3).

4. The tensioner of claim 1, wherein the second slot (11) is shaped as a ramp to join a bottom of the first longitudinal slot (6) with an outer surface of the piston.

5. The tensioner of claim 1, wherein the pin (12) is held in place by a flexible foil (13) applied to an outer surface of the cylinder (2).

6. The tensioner of claim 5, wherein the flexible foil (13) has two opposite flaps (15), which are L-shaped and are at least partially overlapping.

7. An improved hydraulic tensioner (1) including of a cylinder (2) having a bore and a pawl hole; a hollow piston (3) slidably received by the bore and defining a fluid chamber (4) with the bore having an inner end and an outer end; a spring (8) biasing the piston (3) in a protruding direction from the bore, the improvement comprising:

a no-return device (5, 7) comprising a pawl (7) received by the pawl hole and rack teeth (5) along a length of the hollow piston (3), allowing movement of the piston (3) in a protruding direction and preventing movement in a retracting direction; and an anti-rotation device (6, 12, 14) comprising a longitudinal slot (6) connected to a throat (14) for receiving a pin (12);

wherein when the piston (3) is fully protruding from the cylinder (2), the anti-rotation device is disabled and the piston (3) is disengaged from the no-return device.

8. The tensioner of claim 7, wherein the throat (14) extends around an entire circumference of the piston (3).

9. The tensioner of claim 7, wherein the longitudinal slot (6) is connected to the throat (14) perpendicularly.

10. A method of disabling an anti-rotation device including a first longitudinal slot connected to a second slot at an angle for receiving a pin, from a hydraulic tensioner having of a cylinder (2) having a bore and a pawl hole; a hollow piston (3) slidably received by the bore and defining a fluid chamber (4) with the bore having an inner end and an outer end; a spring (8) biasing the piston (3) in a protruding direction from the bore; and a no-return device (5, 7) comprising a pawl (7) received by the pawl hole and rack teeth (5) along a length of the hollow piston (3), allowing movement of the piston (3) in a protruding direction and preventing movement in a retracting direction; the steps comprising:

a) extracting the piston (3) from the cylinder (2) until the pin (12) reaches an end of the first longitudinal slot (6) level with the second slot (11,14); and b) rotating the piston (3) with respect to the cylinder (2) to bring the pin (12) in the second slot (11, 14), disengaging the piston (3) from the no-return device (5, 7).

11. The method of claim 10, wherein the second slot (11) is connected to the first longitudinal slot (6) at a right angle.

12. The method of claim 10, wherein the second slot is a throat (14) perpendicularly connected to the first longitudinal slot (6).

* * * * *